Feb. 11, 1947. J. GAMMACK 2,415,740
FLEXIBLE DEFROSTER
Filed Dec. 15, 1943 2 Sheets-Sheet 1

INVENTOR.
JAMES GAMMACK
BY George Douglas Jones
ATTORNEY

Feb. 11, 1947.  J. GAMMACK  2,415,740
FLEXIBLE DEFROSTER
Filed Dec. 15, 1943   2 Sheets-Sheet 2
FIGURE 3.
FIGURE 4.
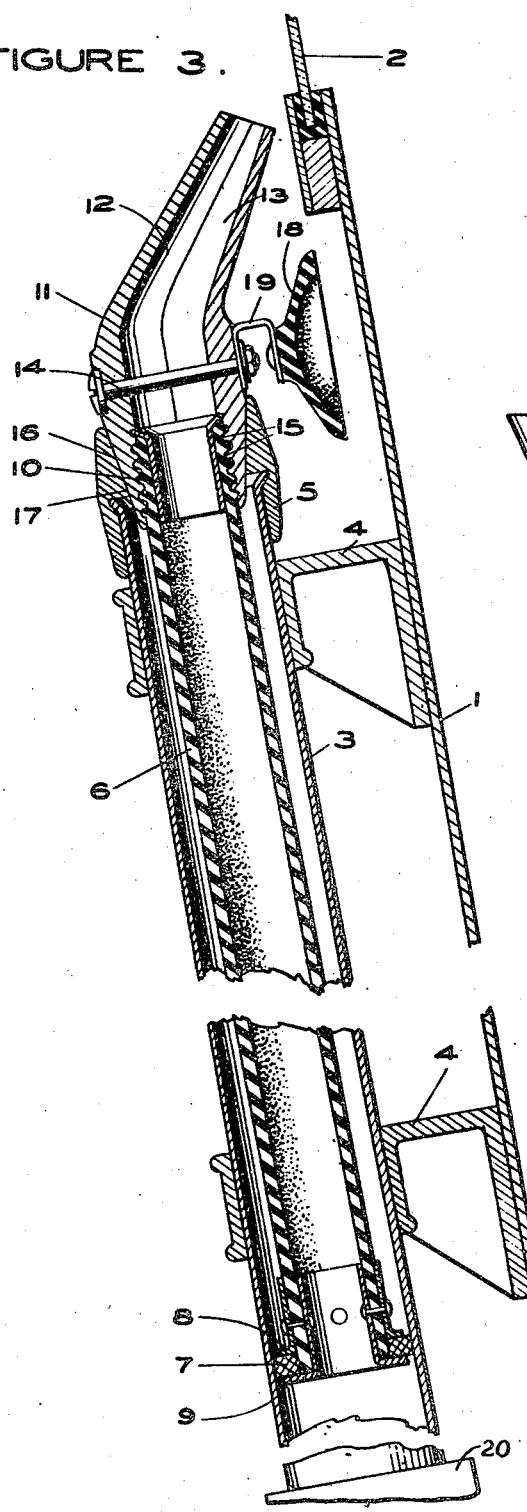
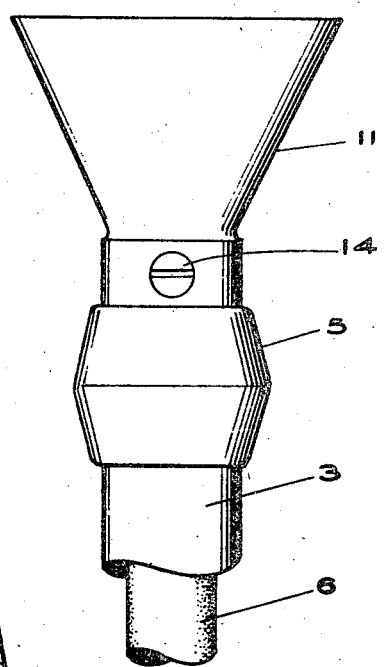
INVENTOR.
JAMES GAMMACK
BY George Douglas Jones
ATTORNEY Patented Feb. 11, 1947

2,415,740

UNITED STATES PATENT OFFICE 2,415,740

FLEXIBLE DEFROSTER

James Gammack, Middle River, Md., assignor to The Glenn L. Martin Company, Middle River, Md., a corporation of Maryland Application December 15, 1943, Serial No. 514,345

5 Claims. (Cl. 20—40.5)

This invention relates to a defrosting device adapted to be mounted adjacent a window of a vehicle. It is desirable to have the defroster installation mounted on the structure of the vehicle below the window so as not to interfere with vision therethrough. Under certain conditions, it is necessary to defrost a remote portion of the window. For this reason, a defroster has been invented which may be stowed underneath the window but which may be elevated to an operative position for defrosting remote parts of the window.

An object of this invention is the provision of a flexible defroster unit, which in its stowed position, will serve to defrost a portion of a window.

Another object of the invention is the provision of a defroster which is flexible so that it may be moved over a window to defrost a large area.

Another object of the invention is the provision of a defroster unit, the nozzle of which may be secured in any position to defrost a predetermined portion of the window.

Further and other objects will become apparent from the description of the accompanying drawings which form a part of this disclosure and in which like numerals refer to like parts.

In the drawings:

Figure 3 is a sectional view through the defroster.

Figure 4 is a partial plan view showing the defroster nozzle.

Figure 1:
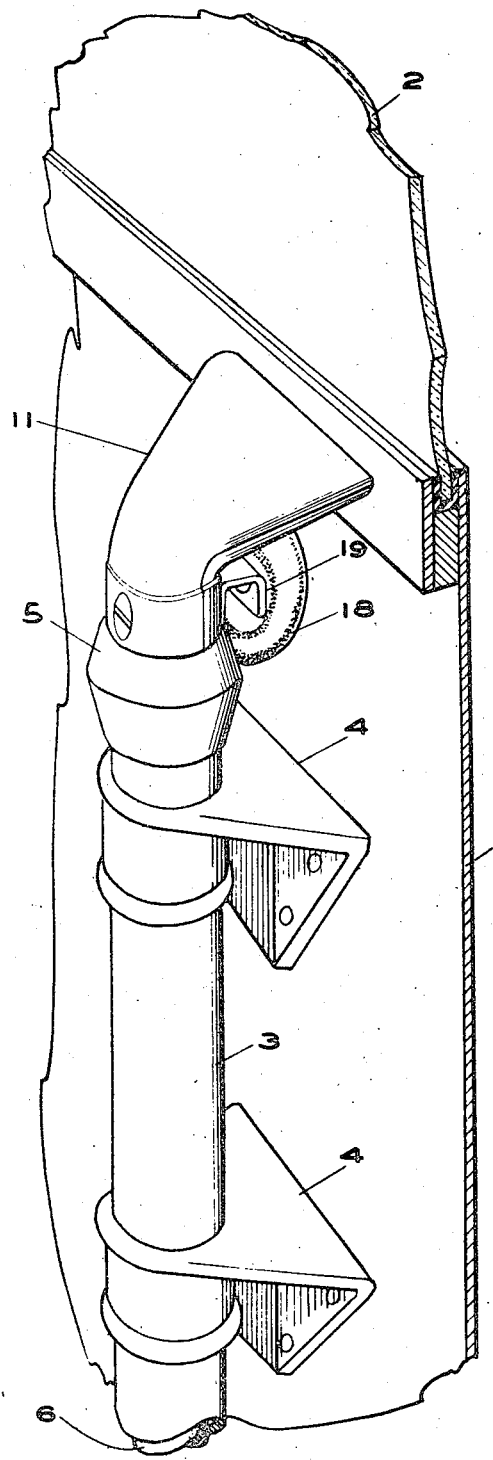
Figure 1 is a fragmentary perspective view showing the defrosting device in the stowed position.

Figure 1 of the drawings shows the defroster assembly secured to the structure of the vehicle 1 below a window 2. This defroster comprises a tube 3 mounted by brackets 4 on the wall structure 1 of the vehicle. Tube 3 is a generally self-supporting tube of either metal or plastic and has a fitting 5 on the upper end which serves as a support for the nozzle structure when in the retracted position. One end of the tube 3 is connected to a source of warm air 20 for defrosting purposes. Tube 6 is mounted within tube 3 and is of a semi-rigid or self-supporting material which will maintain its shape and support the nozzle, but will bend to permit moving of the nozzle over the surface of the window. The lower end of the tube 6 has a sealing gasket 7 secured between flanges 8 and 9 which are secured to tube 6. Gasket 7 affords a pressure seal between tubes 6 and 3. Due to the relative size of the gasket and the compression of the retaining flanges, the gasket frictionally engages tube 3. When tube 6 is withdrawn from tube 3, the gasket will tend to hold the end of tube 6 relative to tube 3 by the friction of the gasket on the inner wall thereof.

The upper end of the tube 6 has an inner rigid tubular member 10 positioned within the end of the tube. Nozzle 11 is made up of two parts, 12 and 13, secured together by a bolt 14. The cooperating parts 12 and 13 form a nozzle, having one end formed to spread the air over a considerable area of the window and the other end adapted to be clamped over the tube 6. The portion of the nozzle engaging the tube has formed therein annular ridges 15 which engage the tube. Tube 10 serves as a backing for the clamping portion of the nozzle to prevent the collapse of the tube. The outside portion of this end of the nozzle is tapered as shown at 16 to fit within a similar tapered portion 17 of fitting 5. Suction cup 18 is secured by a bracket 19 to the end of bolt 14 that extends through the nozzle.

Figure 2:
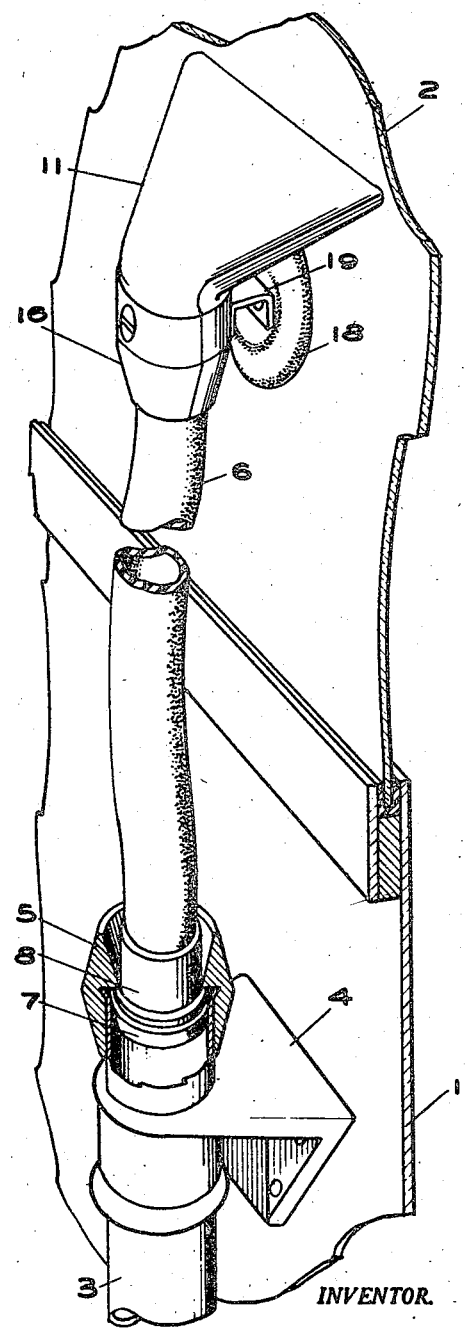
Figure 2 is a fragmentary perspective view showing the defrosting device in an extended position.

The operation of this device is illustrated in Figures 1 and 2. Figure 1 shows the nozzle on the end of the flexible tube nested within fitting 5 of tube 3 in the retracted position. When it is desired to use the defroster on a remote portion of the window, the nozzle may be lifted with tube 6 which slides within tube 3. If the nozzle is lifted only a short distance until the mouth of the nozzle directs warm air on the lower portion of the window, the inner tube 6 is sufficiently self-supporting with the aid of the friction gasket 7, to hold the tube in this position. For defrosting a more remote point, the nozzle may be lifted a greater distance up on the window and the suction cup used to attach the nozzle in the desired position for defrosting a greater area. The nozzle may, of course, be so mounted that in the stowed position, warm air will normally impinge upon the window and defrost the lower portion. It may be more desirable in some installations to have the defroster assembly well below the window frame. In installations, where a greater thickness of a wall is available than that illustrated in the drawings, tube 3 may be completely recessed in the wall with only the nozzle projecting therefrom which can be lifted into any desirable operative position.

It is to be understood that certain changes, alterations, modifications and substitutions can be made without departing from the spirit and scope of the appended claims.

I claim as my invention:

1. A defrosting device adapted to be mounted adjacent a vehicle window comprising a tube, one end of which is securely mounted on the vehicle structure adjacent the window, the other end communicating with a source of air, a second tube telescopically mounted within said first mentioned tube, said second tube being of self-supporting flexible material, a defroster nozzle mounted on the end of said second tube whereby the nozzle may be moved to direct air over the surface of the window, and suction cup means on said nozzle to secure said nozzle in a pre-determined position on the window.

2. A defrosting device adapted to be mounted adjacent a vehicle window comprising a tube having one end securely mounted on the vehicle structure adjacent the window, the other end being in communication with a source of air, a second tube telescopically mounted on said first mentioned tube, said second tube being of self-supporting flexible material, having a defroster nozzle on the end thereof adapted to be moved to direct air over the surface of the window, and suction cup means on said nozzle to secure said nozzle in a pre-determined position on the window.

3. A defrosting device for directing air adapted to be mounted adjacent a vehicle window comprising a tube, one end of which is securely mounted on the vehicle structure adjacent the window and the other end being in communication with a source of air, a second tube telescopically mounted on said first mentioned tube, said second tube being of self-supporting flexible material, a defroster nozzle mounted on the end of said second tube whereby the nozzle may be moved to direct air over the surface of the window, sealing means mounted on one tube to frictionally engage the other tube to restrain the motion of one tube relative to the other, and means to secure the nozzle end of the tube in a predetermined position on said window.

4. A defrosting device adapted to be mounted adjacent a vehicle window comprising a tube, one end of which is flared and mounted on the vehicle structure adjacent the window, a second tube having a nozzle on one end, the other end telescopically engaging said first tube, the inner end of said nozzle so formed that it will seat in and be supported by the flared end of said first tube in a position that air from the nozzle will be directed toward the lower portion of the window.

5. A defrosting device adapted to be mounted adjacent a vehicle window comprising an outer rigid tube having an open end, the other end of said tube being connected to a source of warm air, a second tube of self-supporting but flexible construction mounted within said rigid tube having a sealing gasket compressively retained between flanges mounted thereon, and frictionally engaging the outer tube, the other end of said inner tube having a tubular insert adjacent one end, a nozzle adapted to be secured on said end of said tube in clamping relation thereto, said tubular member forming a backing to support the tube against collapse at the portion thereof to which the nozzle is clamped, said nozzle having a tapered portion adapted to seat in the open end of the outer tube in the retracted position.

JAMES GAMMACK.

REFERENCES CITED

The following references are of record in the file of this patent:

UNITED STATES PATENTS

| Number | Name | Date |
|---|---|---|
| 2,200,503 | Judell | May 14, 1940 |
| 2,155,355 | Booth | Apr. 18, 1939 |
| 1,996,019 | Hueber | Mar. 26, 1935 |
| 1,625,306 | Frattallone | Apr. 19, 1927 |
| 1,485,718 | Ryan | Mar. 4, 1924 |
| 246,135 | Hickman | Aug. 23, 1881 |
| 1,721,832 | Porter | July 23, 1929 |
| 765,169 | Dingman | July 19, 1904 |